United States Patent Office 3,013,915
Patented Dec. 19, 1961

3,013,915
REINFORCED POLYOLEFINS AND PROCESS FOR MAKING SAME
Willard L. Morgan, Newark, Ohio, assignor to Owens-Corning Fiberglas Corporation, a corporation of Delaware
No Drawing. Filed Apr. 23, 1958, Ser. No. 730,262
25 Claims. (Cl. 154—43)

This invention relates to reinforced plastics and more particularly to polyolefins reinforced with glass, particularly fine glass fibers or thin glass flakes.

It is known that glass in a number of forms is a good reinforcing material for plastics and that its use as such improves the physical properties of the plastic. The polyolefins have a relatively low modulus. For certain applications, e.g., molded objects, structural sheets, etc., it would be advantageous to be able to increase the strength and modulus of polyolefins by reinforcement. The resulting reinforced polyolefins would possess good dimensional, tensile, flexural, bursting and tear strengths.

Glass, particularly in the form of fine glass fibers, is considered to be more-or-less an ideal reinforcing material, but its great affinity for water means that when polyolefins are reinforced with glass, the adhesion between the two substances is greatly weakened in the presence of water, unless some chemical means of effectively coupling the polyolefins and glass is found. Good adhesion must be obtained between the polyolefin and glass, for without it the bond strength is weak, and if high external forces are applied, the bond is broken or delamination occurs. A good bond must exist so that when stresses are transferred from fiber to fiber through the plastic material, there will be no high stress concentrations. Good adhesion is also required to prevent buckling of the fibers under compression and to allow the fibers to go into tension if the laminate is put into tension or flexure.

In order then to make a reinforced polyolefin for molding, stamping, or like processes and to form strong laminates of polyolefin and glass, it is necessary to provide a suitable way of coupling the two to form a permanent bond which will remain permanent even in the presence of water.

A great deal of work has been done on bonding the so-called "polyesters" (e.g., a glycol maleate and styrene mixture) to glass fibers by using a "coupling agent" such as vinyl trichlorosilane or related product as a treatment for the glass before bonding. Although such materials do improve the bonding of polyolefins to glass, we have found that a much better bond may be made by using a coupling agent in conjunction with a source of dehydrogenating radicals. The resulting bonded glass and polyolefin combination exhibits excellent wet flexural strength and remains bonded even after being soaked in water at 140 to 150° F. for as long as 500 hours.

It is therefore an object of this invention to provide a glass-reinforced polyolefin which exhibits good bonding and flexural strength in either the wet or dry condition. Among other objects of this invention may be listed the following:

To provide reinforced polyolefins with improved dimensional tensile, flexural, bursting and tear strengths;

To provide a treatment consisting of a combination of coupling agent and source of dehydrogenating radicals which may be applied to glass and which will permanently interbond it to polyolefin when the polyolefin is fused to the glass;

To provide glass fibers, flakes, unwoven and woven glass materials and other forms of glass which are pretreated with the above-mentioned combination which permits the direct bonding of the glass to a polyolefin;

To provide a glass-reinforced polyolefin suitable for a molding compound;

To provide glass-reinforced polyolefin stamping or vacuum-forming plastic sheets;

To provide a glass-polyolefin laminate with greatly improved wet and dry flexural strength;

To provide means for molding or otherwise forming reinforced polyolefin articles which may be exposed to high humidities or placed in contact with water for extended periods of time without being adversely affected;

To provide a method for treating glass either at the time it is manufactured or after it has been formed into final form, by whatever method desired, which will permit the sized glass to be bonded to a polyolefin; and To provide a method for making permanently interbonded glass polyolefin laminates, molding compounds and reinforced sheets.

These and other objects will become apparent in the following discussion and description of this invention.

The polyolefins suitable for the practice of this invention are those which may be termed the "lower" polyolefins which are film-forming, essentially crystalline plastics. The term "lower" polyolefins is used to include such plastics formed from monomers containing not more than four carbon atoms. Typical polyolefins suitable for bonding to glass by the process of this invention include, but are not limited to, polyethylene having a molecular weight of at least 4,0000 (both low- and high-density), isotactic high-melting polypropylene, and the isotactic polybutylenes. This definition does not therefore include such amorphous materials as polyisobutylene and the like.

The glass suitable for reinforcing material may be in any convenient form such as fibers which may of course be formed into woven or dry laid mats, milled fibers, chopped strands, flakes, sheets, or powder. Glass normally designated as soda glass and borosilicate types are all suitable for reinforcing materials.

In general, the process of this invention of bonding glass to polyolefins and the forming of reinforced plastics comprises the steps of cleaning the glass surface, applying a coupling agent to it, treating with a chemical agent which is a source of dehydrogenating or oxidizing radicals, contacting the polyolefin with the glass, and fusing it by heating the polyolefin above its melting point to complete the interbonding.

It is believed that a direct surface bonding takes place between the glass and the polyolefin via the coupling agent and the dehydrogenated or oxidized surface layer of polyolefin formed by the action of dehydrogenating compounds or radicals which are preferably of a peroxide nature. Thus it may be hypothesized that the coupling agent is first chemically bonded to the glass surface by Si—O— bonds arising between the coupling agent and Si—OH groups on the glass surface. Then the radical source is decomposed to furnish a radical capable of dehydrogenating a number of the $CH_2$ groups in the polyolefin and/or in the coupling agent to leave "free radicals" available to link the coupling agent to the polyolefin, thus completing the strong permanment bond between the polyolefin and the glass surface through the coupling agent. It will be shown in the data presented in the examples below that when the source of dehydrogenating radicals is omitted, the bond is not as strong as when this material is part of the over-all treatment process.

For example, a vinyl silane, represented by

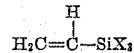

may be used as a coupling agent. It can be shown that it will hydrolyze in the presence of water, or other suitable hydrolyzing solvent, to form

bonds which are unstable and which react with the surface of a glass to form the stable Si—O—Si bonds, thus chemically bonding the coupling agent to the glass surface. At this point the radical source, which may be represented for example as an organic peroxide such as dicumyl peroxide,

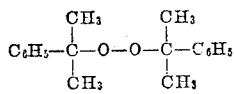

is distributed over the treated glass surface.

When the source of dehydrogenating radicals or of oxidizing radicals is subsequently decomposed to free these radicals in the presence of a polyolefin, there results a number of dehydrogenated polyolefin residues of either unsaturated linked carbons, or aldehyde, ketone or carboxyl groups. These polyolefin residues, produced by surface reactions upon the polyolefins, link the unaltered or unreacted polyolefin main body through the surface dehydrogenated "free radicals" to the vinyl portion (or other reactive portion) of the coupling agent used. Thus, while there is probably a predominance of carbon-to-carbon bonds in the linkages established, it may be presumed that some aldehyde, ketone and unsaturated group cross-linkages are created in the process.

Suitable coupling agents are the silanes of the general structure of R—Si—X₃ where R may be a long-chain alkyl radical, NH₂, or preferably an unsaturated hydrocarbon radical capable of reacting with free radicals, and X is an organic or inorganic radical which can be readily hydrolyzed to form silanols and/or siloxysilanols in the presence of water. R is preferably a vinyl group, i.e.,

and X is chlorine, acetoxy, ethoxy, etc. Typical coupling agents include, but are not limited to, vinyl trichlorosilane, vinyl triacetoxysilane, vinyl triethoxysilane, proprietary soluble vinyl silanes such as GS–1, Y–1087, and Y–1020 sold by Union Carbide and Chemical Corporation, and stearyl trichlorosilane, the last named being representative of a coupling agent in which R is a long-chain alkyl radical.

In addition to coupling agents which fall within the general definitions given above, other coupling agents may be used. These include, but are not limited to, methacrylato chromyl chloride (sold as Volan by E. I. du Pont de Nemours and Company); stearato chromyl chloride (sold as Quilon by E. I. du Pont de Nemours and Company); resorcileto chromyl chloride; gamma amino propyl triethoxysilane (sold as Y–1100 by Union Carbide and Chemical Corporation), resorcinol-formaldehyde, phenol-formaldehyde, phenylsilane, and finishes developed by the United States Naval Ordnance Laboratory which are reaction products of alkyl or vinyl trichlorosilane and phenolic compounds.

The coupling agents are preferably those which have relatively low boiling points, which are soluble in hydroxyl-producing, relatively volatile solvents having boiling points below 150° C. (e.g., water or alcohol), and which by reaction with such solvents are hydrolyzed to silanols and/or siloxysilanols in solution. Once these coupling agents are mixed with water or other suitable solvents and thus reacted they are no longer volatile.

Although the coupling agents are conveniently put on in the form of a dilute water or alcohol solution and contacted with the glass by dipping the glass therein, it is also possible to deposit the coupling agent on the glass surface by such other techniques as spraying them on as a mist or vaporizing them onto a glass surface. The solution of coupling agents may range in concentrations from about 0.1 to about 10% by weight of the total solution with the preferable range being from about 0.5 to 1%. It is not known precisely how much of the coupling agent actually reacts with the glass surface, but sufficient quantities are present in the concentrations specified to result in an excellent final bonding.

The source of dehydrogenating radicals will generally be an organic peroxide which may be an aryl alkyl peroxide such as dicumyl peroxide; an ester peroxide such as tertiary-butyl perbenzoate or ditertiary diperphthalate; an aromatic acyl peroxide such as benzoyl peroxide; or an aliphatic acyl peroxide such as lauroyl peroxide. Such dehydrogenating radical sources preferably have low volatilities and low decomposition points, i.e., below about 180° F. to insure that they function effectively in the role described for them above. Normally, they will be deposited from an organic solution ranging in a weight concentration from about 0.5 to about 3% of the total weight of the solution. The solvent used should not, of course, interact with the radical source or decompose it to any appreciable extent at the temperature used for application. The preferred source of dehydrogenating radicals is dicumyl peroxide in an alcohol solution equivalent to about 1% concentration by weight.

Before applying the coupling agent to the glass surface it is usually necessary to clean the surface thoroughly. Several ways of cleaning glass surfaces are known in the art and any of these may be used. Cleaning is required in particular if the glass has deposited upon it the normal protective lubricating size used in its manufacture. The ingredients making up such a lubricating size must be removed or chemically altered before the process of this invention can be carried out. As is usual in the case of handling glass, care must be exercised that the cleaning treatment does not materially decrease the tensile strength of the glass.

It is generally preferred to heat clean the glass by techniques known in the art. Thus for example, in the case of a glass fiiber tape or woven fabric, it may be passed through heating chambers at about 850° F. at the rate of about 10 to 20 feet per minute. It may be also treated by placing it in an oven at about 500° F. until most of the volatiles are removed and then raising the temperature for a short time to about 850° F. to burn off any residual organic matter.

When the glass surface has been thoroughly cleaned by any suitable process, it is then treated with the coupling agent and radical source. The coupling agent and radical source may be applied in two steps, or in one step. In the two-step procedure the coupling agent is deposited on the glass surface in the form of a solution, mist, or vapor as described above. If it is deposited in the form of a solution the solvent is then evaporated. The glass treated with the coupling agent is then baked at a temperature up to about 230° F. to allow the coupling agent to bond to the glass surface. The second step consists of putting on the dehydrogenating or oxidizing radical source preferably in the form of a solution. The solvent is then removed at temperatures below the decomposition temperature of the radical source.

In the one-step process, the coupling agent and radical source are both dissolved in the same solvent and deposited on the glass surface simultaneously. In the one-step process the solvent of course must be chosen so that no appreciable decomposition or reaction of the radical source occurs, and the baking is eliminated since the radical source cannot be exposed to heat sufficient to cause its premature decomposition.

The treatment applied by the one-step or two-step process may be put on the glass after it is formed into fibers, flakes, etc., or one or both of the components of the treatment may be deposited on the glass during its formation, provided, of course, that if the dehydrogenating radical source is put on during the glass formation care is exercised not to decompose it prematurely.

In bonding the polyolefin to the treated glass, the polyolefin may be applied in one of several forms. In all events, in the final stage of bonding the polyolefin must be reduced to a molten state. Thus, the polyolefin may be brought in contact with the glass while in the form of an emulsion, a solution, a film, or a melt. When forms of the polyolefin other than a melt are used, the resulting glass-polyolefin combination must be heated to a temperature high enough to melt the polyolefin. It is preferable, however, that the temperature be not so high as to cause appreciable degradation of the polyolefin. Pressure may be applied and if polyolefin-glass laminates are being formed, pressures between about 25 and 50 p.s.i. may be employed in forming the laminates.

An alternative method of applying the source of dehydrogenating or oxidizing radicals is to pretreat the polyolefin with a solution of the radical source or, as in Examples II and III, mix the solution of the radical source with a solution or a water dispersion of the polyolefin. The glass then has the coupling agent deposited on it and when the pretreated polyolefin and pretreated glass are contacted and the polyolefin fused, an equally good bonding is achieved.

In order to evaluate the interbonding of the glass and polyolefin, two types of measurements were made on the interbonded material. These measurements may be referred to as "time to peel" and as "bonding strength." Samples were made up by interposing a piece of the polyolefin film measuring 3/4 inch by 1 inch between two strips of 3/4 inch woven glass fiber tape 2 1/2 inches long. The polyolefin was placed at one end of this assembly. After bonding was accomplished the samples were immersed in water maintained at between about 140 and 150° F. The samples were periodically removed to determined whether or not the assembly could be peeled apart without ripping or tearing of the glass tape. The time to peel was then expressed in hours of immersion required before the tape-polyolefin assembly could be thus separated.

In the bonding strength measurements a Shopper apparatus was used in which the unbonded ends of the glass tape were firmly attached to opposing jaws. When the jaws were gradually pulled apart, the force, in pounds, required to break the bond of the polyolefin-glass assembly was measured. The figures given are not in pounds per square inch but are in pounds required to separate the sample size indicated.

EXAMPLE I

Woven glass fiber strips measuring 3/4 inch by 2 1/2 inches were heat cleaned at 500° F. for one hour, and then at 850° F. for 2 to 3 hours, and then allowed to cool slowly in a muffle furnace to room temperature. The clean glass strips were then immersed in a 0.5% aqueous-alcoholic solution of the coupling agent, air dried, and the treated glass strips baked at 230° F. for 1 hour. After the strips had been cooled, they were dipped in a 1% alcohol solution of the source of dehydrogenating radicals and air dried at room temperature.

The polyolefin was used in the form of a 5-mil film strip 3/4 inch wide and 1 inch long which was also dipped in the 1% ethyl alcohol solution of the source of dehydrogenating radicals. This pretreatment of the polyolefin is not necessary and may be omitted, if desired. The polyolefin strip was placed between two strips of the glass fabric being located at one end to leave approximately 1 1/2 inches of the glass strips unbonded. The glass-polyolefin assembly was then heated at between about 365 to 430° F. for from about 1/2 to 2 minutes to completely fuse the polyolefin, the temperature depending upon the polyolefin used. Pressures ranging from 18 to 55 p.s.i. were applied during the fusion step. After the bonded sample strips were cooled, they were tested to determine their time-to-peel values and bonding strengths as explained above.

A number of samples were made up in the manner described and the results are given in the following tabulations which indicate both time-to-peel and bonding strength values for the samples.

Table I

TIME TO PEEL IN HOURS FOR POLYETHYLENE/GLASS BONDS

[Water at 140–150° F.]

| Coupling Agent [1] | Wt. Percent Dicumyl Peroxide | |
|---|---|---|
| | 0% | 1.0% |
| None | 0.25 | 0.25 |
| Vinyl Trichlorosilane | 1.0 | 500 |
| Vinyl Triacetoxysilane | 1.0 | 96 |
| Stearyl Trichlorosilane | | 400 |
| Y-1087 } Soluble vinyl silanes manufactured by | 1.0 | 474 |
| Y-1020 } Union Carbide and Chemical Corporation | 1.0 | 474 |

[1] Coupling agents were deposited by dipping the woven glass fiber tapes in 0.5% aqueous solutions.

Table II

BONDING STRENGTH OF TEST SAMPLES

[Polyethylene strips 3/4 inch x 1 inch bonded between 2 woven 15-mil glass fabric tapes 3/4 inch x 2 1/2 inches]

| | Bonding Strength in Pounds | | | | |
|---|---|---|---|---|---|
| | Hours of Immersion in Water at 140–150° F. | | | | |
| | 0 | 0.25 | 1 | 3 | 17 |
| Unsized Glass Tape | 2.4 | 0.5 | | | |
| Dicumyl peroxide | 4.2 | 1.0 | 1.1 | | 0.25 |
| t-Butyl perbenzoate | 6.0 | 1.3 | | | 0.37 |
| Vinyl Triethoxysilane: | | | | | |
| Without peroxide | 1.4 | 0.84 | | 0.80 | |
| Dicumyl peroxide | 3.3 | | 1.90 | 1.37 | 0.90 |
| t-Butyl perbenzoate | 3.4 | 1.75 | 1.06 | | |
| Vinyl Triacetoxysilane: | | | | | |
| Without peroxide | 2.4 | 1.25 | 1.50 | | 0.91 |
| Dicumyl peroxide | 4.7 | 3.5 | 2.42 | | 1.62 |
| t-Butyl perbenzoate | 2.9 | 1.78 | 1.87 | | 0.68 |
| Vinyl Trichlorosilane: | | | | | |
| Without peroxide | 2.6 | 1.18 | 1.31 | 0.94 | 1.31 |
| Dicumyl peroxide | 3.4 | 3.75 | 2.82 | 2.18 | |
| t-Butyl perbenzoate | 3.3 | 2.65 | 2.12 | | 1.50 |
| GS-1[1]: | | | | | |
| Without peroxide | 1.7 | 0.88 | 0.97 | 0.68 | |
| Dicumyl peroxide | 3.4 | 1.54 | 1.68 | 1.31 | 0.60 |
| t-Butyl perbenzoate | 2.5 | 1.31 | 0.43 | | |
| Y-1087[1]: | | | | | |
| Without peroxide | 2.1 | 1.25 | 0.93 | 0.63 | |
| Dicumyl peroxide | 3.9 | 2.62 | 2.41 | | |
| t-Butyl perbenzoate | 3.9 | 2.00 | 1.62 | | 1.25 |
| Y-1020[1]: | | | | | |
| Without peroxide | 2.2 | 0.94 | 0.50 | 0.46 | |
| Dicumyl peroxide | 4.1 | 3.75 | 2.75 | | |
| t-Butyl perbenzoate | 3.8 | 1.53 | 2.12 | | 1.06 |

[1] Soluble vinyl silanes manufactured by Union Carbide and Chemical Corporation.

NOTE.—Coupling agents were used as 0.2% water solutions, and radical sources were used as 0.5% alcohol solutions.

In the tabulation showing time-to-peel, it will be seen that when the process of this invention is employed to treat glass fabric, the time which the resulting sample must be immersed in water at 140–150° F. before it can be peeled apart is as much as 500 hours as compared to less than one hour when no size is used for pretreatment of the glass. From the data in Table I it may be concluded that the polyolefin-reinforced glass prepared in accordance with this invention forms an almost permanent bond even when the material is exposed to the most extreme conditions. From Table II it will be seen that improved wet bond strengths are attained using the process of this invention and that dry bond strengths are as good or better than those achieved when the polyolefin is fused to untreated glass. Furthermore, Table II illustrates the fact that the treatment of the glass must include the use of both a coupling agent and a source of dehydrogenating radicals, the combination of the two being responsible for the marked improvement in bonding strengths.

EXAMPLE II

Glass-polyethylene laminates were prepared by the process of this invention. The glass used was in the form of 5-mil woven glass fiber tape measuring 2½ inches x ¾ inch. The strips of glass tape, after heat-cleaning, were treated by dipping them in an 0.2% aqueous solution of vinyl trichlorosilane. The tapes were subsequently air-dried and heated in an oven at 230° F. for one hour. The tape containing this coupling agent was then treated with a polyethylene solution containing the source of dehydrogenating radicals as described below.

A 10% by weight soltuion of polyethylene (molecular weight of 12,000) in toluene was prepared by heating to about 200° F. This polyethylene solution was cooled to about 130° F. and to it was added dicumyl peroxide (source of dehydrogenating radicals) in a quantity sufficient to amount to 5% by weight of the polyethylene content in the solution. The tape treated with the coupling agent was dipped in this warm solution. The amount of polyethylene picked up by the tape was equivalent to about 10% by weight of the tape.

Strips of the polyethylene-treated woven glass fiber tape thus prepared were then formed into a laminate assembly by using 8 strips of the glass tape and 7 equal size strips of a 5-mil polyethylene film arranged in alternate layers. The assembly was then placed in a steel mold consisting of a cavity 2½ inches by ¾ inch in size and approximately ½ inch in depth. A plunger corresponding to the size of the cavity was used to apply the necessary pressure. In order to prevent the laminated piece from adhering to the metal parts, cellophane strips were used at the points of contact. The assembly was heated under pressure from about 280 to 380° F. during a period of about 25 minutes. The pressure applied was equivalent to about 35 p.s.i.

The laminate thus formed was evaluated to determine its flexural strength. This was done by placing the laminate sample at rest across two supports and applying a downward force across the center of the sample. The degree of bending or flexing in inches of the laminate was measured for a given force by means of a dial gauge which was initially adjusted to zero. The force was applied by means of a spring scale measuring in units of 50 grams which was converted to pounds per square inch for the sample size and thickness. When a sample began to buckle or break, there was a marked discontinuity in the stress-strain curve. The improvement in flexural strength attained by forming laminates according to the process of this invention may be illustrated in two ways. First, the discontinuity in the stress-strain curve for the laminate prepared in the manner described above occurred with the application of 9100 lbs./in.²; that for a laminate prepared without dicumyl peroxide was 6800 lbs./in.²; while that made without the use of either the vinyl trichlorosilane or the dicumyl peroxide required only 3300 lbs./in.² to achieve the discontinuity in the stress-strain curve and hence break the laminate. Another way of showing the improvement achieved in bonding is the fact that the laminate made according to this invention could, by the process described above, be deflected 0.18 inch without damage; a laminate made without dicumyl peroxide could be deflected 0.14 inch; and one made without either the vinyl trichlorosilane or the dicumyl peroxide could be deflected only 0.1 inch before breaking occurred.

Thus again in this example which illustrates the preparation of a laminate and the use of polyethylene in the form of a solution, it will be seen that to achieve superior bonding it is necessary to employ both a coupling agent and a source of dehydrogenating radicals.

EXAMPLE III

A glass-polyethylene laminate was prepared in the manner described in Example II, except that a water emulsion of polyethylene having an average molecular weight of about 4,000 was used in place of the xylene solution of polyethylene of that example. The dicumyl peroxide was added to the water emulsion as an alcohol solution in a quantity sufficient to amount to 5% by weight of the polyethylene content. The polyethylene emulsion containing the source of dehydrogenating radicals was applied to the woven glass fiber tapes at room temperature.

The resulting glass-polyethylene laminate was evaluated for flexural strength in the manner described in Example II. It required the application of 5,340 lbs./in.² to break this sample and it could be deflected 0.16 inch before being damaged. In contrast to this, a laminate prepared using only vinyl trichlorosilane broke under 2,620 lbs./in.² and a deflection of about 0.09 inch. A laminate prepared without either vinyl trichlorosilane or the dicumyl peroxide broke under 1,520 lbs./in.² and could be deflected only 0.08 inch.

EXAMPLE IV

Glass flakes were dipped first into a 0.2% water solution of vinyl trichlorosilane. The flakes were then air-dried and subsequently heated to approximately 140° F. These pretreated flakes were then dipped into a warm xylene solution of polyethylene containing about 10% polyethylene by weight and dicumyl peroxide equivalent to 5% by weight of the polyethylene content. After drying the flakes to remove the xylene, they were placed in laminar fashion in a mold and a pressure of about 35 p.s.i. was applied while the flakes were heated to 350° F. Upon removal from the mold it was found that the glass flakes were completely bonded by the polyethylene to form a satisfactory molded article.

EXAMPLE V

Woven glass fiber strips measuring ¾ inch by 2½ inches and 15 mils thick were heat cleaned as in Example I. These were then immersed in a 0.2% aqueous solution of Y-1020 (a soluble vinyl silane finish sold by Union Carbide and Chemical Corporation), air dried, and then baked at 230° F. for one hour. After the strips had been cooled, they were dipped in a 1% alcohol solution of benzoyl peroxide and air dried at room temperature.

A strip of 0.005-inch polypropylene ¾ inch by 1 inch was placed between the treated glass fiber strips and located at one end of the assembly as in Example I. The laminate was formed by fusing the polypropylene to the glass strips. This was accomplished by heating the assembly at 190° C. for 2 minutes under a pressure of 18 p.s.i.

The glass-polypropylene laminate was conditioned by soaking in water at 122° F. for 5 hours. The peel strength, as determined by the process described above was 4.37 pounds as compared with 3.50 pounds when only the peroxide was used and 1.00 pounds when neither the coupling agent nor the peroxide was used.

The above examples illustrate the marked improvement in bonding and flexural strength attainable when a coupling agent is used in combination with a source of dehydrogenating or oxidizing radical, in accordance with the teachings of this invention. The improvement in bonding is particularly significant in that it is retained even when the article thus formed is exposed to soaking in water or to extreme moisture conditions.

This invention more particularly provides a way by which polyolefins may be effectively bonded to glass in many forms, and thus also provides reinforced polyolefins with improved characteristics, especially increased strength and modulus.

I claim:

1. Method of treating a glass surface to render it bondable to an essentially crystalline polyolefin formed from monomers containing not more than four carbon atoms, characterized by the step of treating said glass prior to bonding with a coupling agent in a solution containing available hydroxyl ions and with an organic peroxide which decomposes below about 180° F., said coupling agent having the formula $CH_2CH—Si—X_3$ wherein X is a radical which can be readily hydrolyzed in the presence of said hydroxyl ions thereby to convert said coupling agent to a compound selected from the group consisting of silanols, siloxysilanols and mixtures thereof.

2. Method of bonding glass to a polyolefin film-forming crystalline plastic formed from monomers containing not more than four carbon atoms, comprising the steps of treating the surface of said glass with a solution of a coupling agent containing available hydroxyl ions and with an organic peroxide which decomposes below about 180° F., said coupling agent having the formula $$CH_2CH—Si—X_3$$

wherein X is a radical which can be readily hydrolyzed in the presence of said hydroxyl ions thereby to convert said coupling agent to a compound selected from the group consisting of silanols, siloxysilanols and mixtures thereof; contacting the treated glass surface with said polyolefin and heating the resulting glass polyolefin assembly to a temperature above the melting point of the polyolefin but below that at which any appreciable thermal decomposition of the polyolefin takes place.

3. Method in accordance with claim 2 wherein said step of treating the surface of said glass comprises dipping said glass in said solution of said coupling agent to coat said glass surface, baking the resulting coated glass surface, and dipping said coated glass into a solution of said peroxide at a temperature below that at which any appreciable decomposition of said peroxide takes place.

4. Method in accordance with claim 3 wherein said step of treating the surface of said glass comprises dipping said glass in said solution of said coupling agent containing said peroxide to deposit them simultaneously on said surface, and drying the resulting coated glass at a temperature below that at which any appreciable decomposition of said peroxide takes place.

5. Method of bonding glass to a polyolefin film-forming crystalline plastic formed from monomers containing not more than four carbon atoms, comprising the steps of treating the surface of said glass with a solution of a coupling agent containing available hydroxyl ions, said coupling agent having the formula $CH_2CH—Si—X_3$ wherein X is a radical which can be readily hydrolyzed in the presence of said hydroxyl ions thereby to convert said coupling agent to a compound selected from the group consisting of silanols, siloxysilanols and mixtures thereof; treating said polyolefin with an organic peroxide which decomposes below about 180° F.; contacting the treated glass surface with the treated polyolefin, and heating the resulting glass-polyolefin assembly to a temperature above the melting point of said polyolefin but below that at which any appreciable thermal decomposition of said polyolefin takes place.

6. Method in accordance with claim 5 wherein said treating of said polyolefin comprises adding a solution of said peroxide to a dispersion of said polyolefin.

7. Method in accordance with claim 5 wherein said treating of said polyolefin comprises adding a solution of said peroxide to a solution of said polyolefin, said solution of said polyolefin being maintained at a temperature below that at which any appreciable decomposition of said peroxide takes place.

8. Method in accordance with claim 5 wherein said treating of said polyolefin comprises dipping said polyolefin in a solution of peroxide.

9. Method of forming a polyolefin-glass laminate comprising the steps of treating the surface of glass with a solution of a coupling agent containing available hydroxyl ions and with an organic peroxide which decomposes below about 180° F., said coupling agent having the formula $CH_2CH—Si—X_3$ wherein X is a radical which can be readily hydrolyzed in the presence of said hydroxyl ions thereby to convert said coupling agent to a compound selected from the group consisting of silanols, siloxysilanols and mixtures thereof; assembling a plurality of alternating treated glass and polyolefin layers, and heating the resulting assembly to a temperature above the melting point of said polyolefin and below that at which any appreciable thermal decomposition of the polyolefin takes place, said polyolefin being further characterized as being essentially crystalline and formed from monomers containing not more than four carbon atoms.

10. Method in acordance with claim 9 further characterized by the subjecting of said assembly to pressures up to about 55 p.s.i. during said heating step.

11. A pretreated glass product, comprising glass the surface of which is coated with the combination of a coupling agent having the formula $CH_2CH—Si—X_3$ wherein X is a radical which can be readily hydrolyzed in the presence of hydroxyl ions thereby to convert said coupling agent to a compound selected from the group consisting of silanols, siloxysilanols and mixtures thereof, and an organic peroxide which decomposes below about 180° F.

12. Glass product in accordance with claim 11 wherein said glass is in fiber form.

13. Glass product in accordance with claim 11 wherein said glass is in flake form.

14. Glass product in accordance with claim 11 wherein said glass is in the form of a woven fabric.

15. Glass product in accordance with claim 11 wherein said glass is in the form of a non-woven mat.

16. A new composition suitable for depositing on a glass surface to improve the bonding of said glass surface to an essentially crystalline polyolefin formed from monomers containing not more than four carbon atoms, comprising in solution an organic peroxide decomposing below about 180° F. and a coupling agent having the formula $CH_2CH—Si—X_3$ wherein X is a radical which can be readily hydrolyzed in the presence of hydroxyl ions thereby to convert said coupling agent to a compound selected from the group consisting of silanols and siloxysilanols and mixtures thereof.

17. A new composition in accordance with claim 16 wherein said coupling agent is vinyl trichlorosilane.

18. A new composition in accordance with claim 16 wherein said peroxide is dicumyl peroxide.

19. A reinforced polyolefin, comprising a polyolefin film-forming crystalline plastic formed from monomers containing not more than four carbon atoms, bonded to glass by the process comprising the steps of treating the surface of said glass with a solution of a coupling agent containing available hydroxyl ions and with an organic peroxide which decomposes below about 180° F., said coupling agent having the formula $CH_2CH—Si—X_3$ wherein X is a radical which can be readily hydrolyzed in the presence of said hydroxyl ions thereby to convert said coupling agent to a compound selected from the group consisting of silanols, siloxysilanols and mixtures thereof, contacting the treated glass surface with said polyolefin and heating the resulting glass polyolefin assembly to a temperature above the melting point of the polyolefin but below that at which any appreciable thermal decomposition of the polyolefin takes place.

20. A reinforced polyolefin in accordance with claim 19 wherein said polyolefin is polyethylene having a molecular weight greater than 4,000.

21. A reinforced polyolefin in accordance with claim 19 wherein said glass is in the form of fibers.

22. A reinforced polyolefin in accordance with claim 19 wherein said glass is in flake form.

23. A polyolefin-glass laminate, comprising a plurality of layers of alternating polyolefin of an essentially crystalline type and glass, said laminate being formed by the steps of treating the surface of glass with a solution of a coupling agent containing available hydroxyl ions and with an organic peroxide which decomposes below about 180° F., said coupling agent having the formula $$CH_2CH-Si-X_3$$

wherein X is a radical which can be readily hydrolyzed in the presence of said hydroxyl ions thereby to convert said coupling agent to a compound selected from the group consisting of silanols, siloxysilanols and mixtures thereof; assembling a plurality of alternating glass and polyolefin layers, and heating the resulting assembly to a temperature above the melting point of said polyolefin and below that at which any appreciable thermal decomposition of said polyolefin takes place, said polyolefin being further characterized as being essentially crystalline and formed from monomers containing not more than four carbon atoms.

24. A laminate in accordance with claim 23 wherein said polyolefin is polyethylene.

25. A laminate in accordance with claim 23 wherein said glass is woven glass fiber.

References Cited in the file of this patent

UNITED STATES PATENTS

| | | |
|---|---|---|
| 2,524,529 | Krieble | Oct. 3, 1950 |
| 2,642,370 | Parsons et al. | Jan. 16, 1953 |
| 2,742,378 | TeGrotenhuis | Apr. 17, 1956 |
| 2,754,237 | Brooks | July 10, 1956 |
| 2,767,519 | Bjorksten | Oct. 23, 1956 |
| 2,888,424 | Precopio et al | May 26, 1959 |

FOREIGN PATENTS

| | | |
|---|---|---|
| 766,528 | Great Britain | Jan. 23, 1957 |